Patented Mar. 6, 1928.

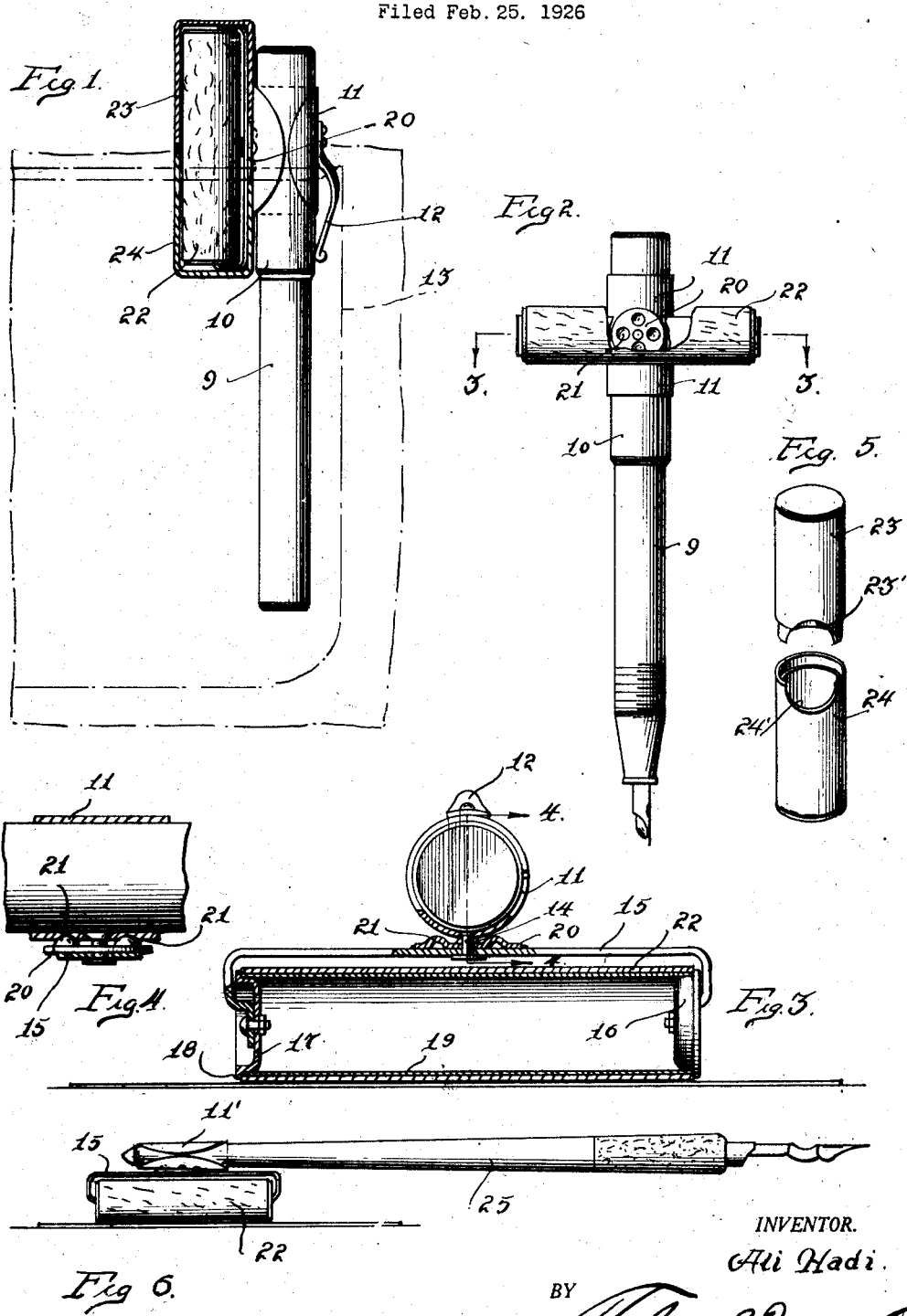

1,661,475

UNITED STATES PATENT OFFICE.

ALI HADI, OF SPRINGWELLS, MICHIGAN.

ROLLER BLOTTER.

Application filed February 25, 1926. Serial No. 90,524.

My invention relates to a roller blotter adapted for attachment to a pen or the like and has for its object the provision of an attachment of this class which may be easily and quickly mounted on a pen so as to provide with the pen, always present, a blotter adapted for use for the usual purposes.

Another object of the present invention is the provision of a roller blotter so mounted and arranged that it may extend either transversely to or longitudinally of the pen when in operative position.

Another object of the invention is the provision of a roller supporting member having retaining means in fixed relation releasably when extending longitudinally or transversely.

Another object of the present invention is the provision of a device of this class which will be simple in structure, economical of manufacture, and highly efficient in use.

Other objects will appear hereinafter.

The invention consists in the combination and arrangement of parts hereinafter described and claimed.

The invention will be best understood from a reference to the accompanying drawings which form a part of the specification and in which, Fig. 1 is a side elevational view of the invention showing it mounted in a pocket with the cap portion in section.

Fig. 2 is a side elevational view of the invention with a part broken away.

Fig. 3 is a sectional view taken on substantially line 3—3 of Fig. 2.

Fig. 4 is a sectional view taken on substantially line 4—4 of Fig. 3.

Fig. 5 is a perspective view of the cap forming portions.

Fig. 6 is a side elevational view of the invention showing it applied to a conventional pen holder.

In the preferred form I have shown the invention applied to a fountain pen having a barrel 9 and the cap 10. Mounted on the cap 10 in embracing relation is a resilient retaining sleeve 11 to which is secured the retaining clip 12, adapted for engaging over the pocket flap 13 to retain the pen in the pocket. This clip being of a well known structure and type. Secured by the pin 14 rotatable to the sleeve 11 is a yoke 15 carrying cup-shaped discs 16 and 17 at the end of each of the legs of the yoke, each disc having a flange 18 adapted to engage the end edges of a roller 19, the discs 16 and 17 being rotatably mounted on the yoke 15. Positioned upon the pin 14 concentrically thereof is a disc 20 having projections 21 formed thereon, this disc being fixedly attached to the yoke 15 by welding or in any other suitable manner. Mounted upon the roller 19 is a cylindrical layer of blotting paper 22.

The device when mounted upon a cap 10, as shown in the drawings, may be used for blotting purposes, the roller 19 rotating as the blotter is drawn across the paper. As shown in Fig. 1 the roller may be extended parallel to the longitudinal axis of the barrel 9 or as shown in Fig. 2 this roller may be extended transversely of the longitudinal axis of the barrel 9. In rotating the yoke 15 through ninety degrees the projections 21 are rotated, two of these projections engaging the retaining sleeve 11, the direction of extension of the roller relatively to the retaining sleeve 11 being dependent upon which pair of projections 21 is in engagement with the retaining sleeve 11, these projections being moved into engagement with the retaining sleeve 11 under such tension to retain the roller in either position of operation.

The yoke 15 is formed from resilient material so that the discs 16 and 17 may be moved out of operative position by spreading the legs of the yoke so that the blotter 22 may be slid onto the roller 19. A cover for the blotter roller is provided comprising a pair of cup-shaped members 23 and 24 which are adapted to telescope as shown in Fig. 1, each of these portions having a notch 23' and 24' respectively for accommodating the disc 20.

It is apparent that there is thus provided an attachment for a fountain pen in which a roller blotter may be used for blotting purposes so that a blotter is always present with the pen.

In Fig. 6 I have shown the device applied to a pen holder 25 of usual structure, the retaining sleeve 11' being tapered to accommodate the taper of the pen holder 25. The structure otherwise is as already described.

While I have illustrated and described the preferred form of structure, I do not wish to limit myself to the precise form of structure shown, but desire to avail myself of such variations and modifications as come within the scope of the appended claims.

Having thus described my invention what

I claim as new and desire to secure by Letters Patent is:

1. A device of the class described comprising a retaining member; a U-shaped supporting member pivotally mounted on said retaining member centrally of the bight of said U-shaped member; a tubular roller; a cup-shaped disc mounted on each of the legs of said U-shaped member; said cup-shaped discs serving as a closure for the ends of said roller; and a blotter positioned on said roller in embracing relation, said U-shaped member being operative while extending transversely of or parallel to the longitudinal axis of said retaining member; and means for retaining said U-shaped member in either operative position.

2. A device of the class described comprising a retaining member; a U-shaped supporting member pivotally mounted on said retaining member centrally of the bight of said U-shaped member; a tubular roller; a cup-shaped disc mounted on each of the legs of said U-shaped member; said cup-shaped discs serving as a closure for said roller; and a blotter positioned on said roller in embracing relation, said U-shaped member being operative while extending transversely of or parallel to the longitudinal axis of said retaining member; a disc mounted on said U-shaped member concentrically of its pivot; and a plurality of projections on said disc adapted for engaging said retaining member for retaining said U-shaped member in either position of operation.

In testimony whereof, I have signed the foregoing.

ALI HADI.